(12) United States Patent
Berejka et al.

(10) Patent No.: US 6,706,404 B2
(45) Date of Patent: Mar. 16, 2004

(54) RADIATION CURABLE COMPOSITION

(75) Inventors: Anthony J. Berejka, Huntington, NY (US); Anthony Pappano, Rochester, NY (US); Laurence S. Larsen, Baldwinsville, NY (US); Daniel E. Montoney, Jamesville, NY (US)

(73) Assignee: Strathmore Products, Inc., Syracuse, NY (US)

( * ) Notice: Subject to any disclaimer, the term of this patent is extended or adjusted under 35 U.S.C. 154(b) by 8 days.

(21) Appl. No.: 09/891,549

(22) Filed: Jun. 26, 2001

(65) Prior Publication Data

US 2003/0008150 A1 Jan. 9, 2003

(51) Int. Cl.⁷ .................. B32B 27/38; B32B 27/32; C08J 7/18; C08L 63/08
(52) U.S. Cl. .............. 428/413; 428/521; 427/386; 427/487; 427/493; 427/508; 525/107; 525/132; 525/523
(58) Field of Search ................. 428/413, 418, 428/457, 500, 521, 523; 427/385.5, 386, 457, 487, 493, 508, 365.5; 526/335; 525/107, 132, 523; 523/400; 528/393

(56) References Cited

U.S. PATENT DOCUMENTS

| | | | |
|---|---|---|---|
| 4,111,871 A | 9/1978 | Aritomi | |
| 4,273,633 A | 6/1981 | Carder et al. | |
| 4,379,039 A | 4/1983 | Fujimoto et al. | |
| 4,421,806 A | * 12/1983 | Marks et al. | 138/132 |
| 4,902,578 A | 2/1990 | Kerr, III | |
| 5,039,740 A | 8/1991 | Anderson et al. | |
| 5,425,997 A | 6/1995 | Costin et al. | |
| 5,612,445 A | 3/1997 | Jones | |
| 5,700,576 A | 12/1997 | Brehm et al. | |
| 6,127,094 A | * 10/2000 | Victor et al. | 430/275.1 |

* cited by examiner

Primary Examiner—Robert Dawson
Assistant Examiner—Michael J Feely
(74) Attorney, Agent, or Firm—George R. McGuire; Bond, Schoeneck & King, PLLC

(57) ABSTRACT

Radiation curable coating compositions that are solventless homogeneous blends of a 1,2-polybutadiene oligomer, an acrylated bis-phenol-A derivative, and reactive compatible compounds are disclosed. Such solventless coatings can be used in a variety of applications, including the high speed coating of metal coil.

17 Claims, 1 Drawing Sheet

WHERE $\eta = 12 - 14$

WHERE $\eta = 16 - 18$

RADIATION CURABLE COMPOSITION

FIELD OF THE INVENTION

This invention is directed to the field of solventless coatings and, more particularly to such coatings that can be cured upon exposure to radiant energy.

BACKGROUND OF THE INVENTION

The coating compositions used in standard coating operations often contain volatile organic compounds (VOCs), solvents, that are driven off during drying and curing operations. "End-of-pipe" pollution control equipment is frequently used to capture such emissions in order to prevent them from becoming undesirable air pollutants.

The radiant energy curable coating compositions of this invention include compositions that cure upon exposure to electromagnetic radiation such as ultraviolet light or radio frequency energy or to ionizing radiation from an electron beam. When coating compositions are to be cured by ultraviolet light, photo initiators are added to the composition. When the radiant energy is a radio frequency field, initiators such as peroxides that decompose with heat generated by the radio frequency field are added to the composition.

These radiant energy curable coating compositions have been found to be particularly efficacious in providing decorative and corrosion resistant coatings on metals. Of interest is the use of these coatings on metal sheet that is processed in a continuous manner and wound into a coil.

U.S. Pat. No. 6,025,024 (Heindrichs, et al.) discloses a metal coil coating process that includes the steps of applying a wet layer of coating on a substrate and heating the coated substrate to dry the coating. The coatings used by Heindrichs et al. all contain substantial amounts of volatile organic compounds, solvents, in order to reduce viscosity for coating application. These coatings have a specified viscosity and are applied to a metal substrate moving at speeds of at least 60 meters per minute. The wet coating is passed under a roll having a raised pattern. The coatings employed can be based upon polyester-urethanes, epoxies, polyesters, polyurethanes, silicone-polyesters, polyvinyl chloride organosols, or polyvinylidene fluoride homopolymers and copolymers. The '024 patent is incorporated herein by reference.

U.S. Pat. No. 6,004,629 (Madigan) discloses a sheet metal coil coating process. The sheet metal can be coated, dried and cured at speeds of 180 to 245 meters per minute (Col. 3, line 5). Such coatings can be cured by exposure to ionizing radiation from an electron beam. The '629 patent is incorporated herein by reference.

U.S. Pat. No. 5,726,216 (Janke, et al.) discloses epoxy resins systems containing various polymers that must contain diaryliodonium type initiators so that they can be cured upon exposure to ionizing radiation. Such curing reactions proceed by cationic mechanisms and pose production challenges in high speed coating operations. Cationic curing entails an extended propagation step between initiation and final or complete cure. In high speed coil coating operations, such cationic systems could result in coil wound upon itself before the curing reaction had been completed. This would result in a blocked, useless roll of metal. The '216 patent is incorporated herein by reference.

SUMMARY OF THE INVENTION

The coating compositions of the present invention comprise 1,2-polybutadienes that have a number average molecular weight (Mn) of about 500 to about 50,000 Daltons. In a preferred embodiment, the 1,2-polybutadienes have molecular weights of about 1,000 to about 5,000 Daltons. The 1,2-polybutadienes refer to butadiene oligomers that are polymerized primarily in a manner that yields pendant vinyl groups because only one of the two double bonds in the butadiene monomer is involved in the polymerization process.

The homogeneous blends of the present invention are achieved by enhancing the solubility of acrylated bisphenol-A derivatives with the 1,2-polybutadiene oligomers by the use of a mutually compatible reactive material that co-cures into the composition. Such reactive materials can be members selected from the group consisting of long-chain aliphatic monofunctional and multifunctional acrylates and methacrylates, long-chain polyoxyalkylene monofunctional and multifunctional acrylates and methacrylates and reactive monomers and compounds substituted with such alkyl and/or alkoxy segments. Such blends do not exhibit phase separation on standing. When applied as coatings and cured using radiant energy, such blends produce coatings that are hard and extensible, exhibiting the needed impact resistance and ductility for bending or forming precoated metal as is commonly practiced when using metal coil stock.

DETAILED DESCRIPTION OF THE INVENTION

Figure 1:
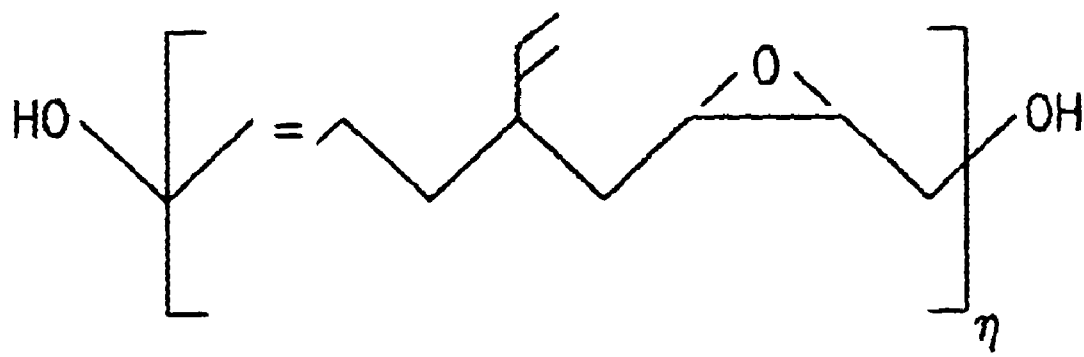
FIG. 1 is a structural formula for an epoxidized 1,2-polybutadiene oligomer.
Figure 2:
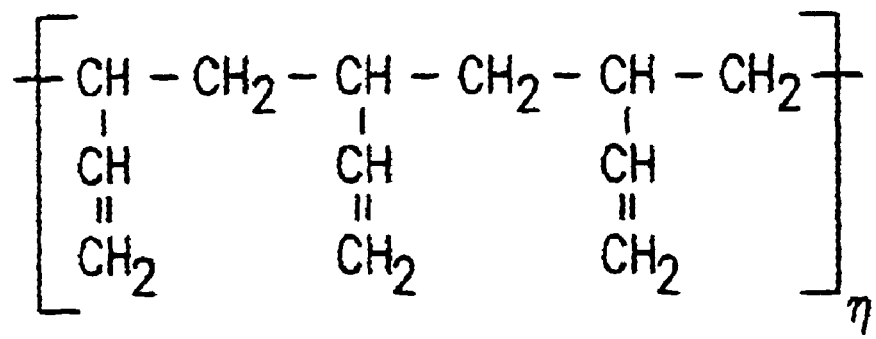
FIG. 2 is a structural formula for a 1,2-polybutadiene oligomer that is a homopolymer.

The curable homogeneous blends of the present invention comprise three basic ingredients. The first ingredient of the curable homogeneous blend is a 1,2-polybutadiene oligomer that has a number average molecular weight of about 500 to about 50,000 Daltons. Most preferably, the 1,2-polybutadiene oligomer has a number average molecular weight of about 1,000 to about 5,000 Daltons.

The 1,2-polybutadiene oligomer can be either a homopolymer or a copolymer, including graft copolymers. The polybutadiene homopolymer can contain both 1,2-polybutadiene and 1,4-polybutadiene. If 1,4-polybutadiene is present in the homopolymer it is included at most in an amount up to about 60% by weight of the polybutadiene homopolymer.

The 1,2-polybutadiene copolymer can include copolymers made by incorporating various monomers during the polymerization process or by subsequently grafting monomers onto polymerized 1,2-polybutadiene backbones. The 1,2-polybutadiene can also be end-capped with various functional groups, such as acrylate, methacrylate, epoxy or hydroxyl groups.

When the 1,2-polybutadiene is a copolymer, a vinyl comonomer is copolymerized with the butadiene. Examples of such monomers are styrene, vinyl acetate, isoprene, ethylene, propylene, alkyl acrylates, alkyl methacrylates, maleic anhydride and mixtures thereof.

When the 1,2-polybutadiene is a graft copolymer, an existing polybutadiene polymer backbone is reacted with a vinyl monomer such as maleic anhydride, acrylic acid or acrylate esters.

When the 1,2-polybutadiene is end-capped with functional groups, the terminal functionality is obtained by methods known to those skilled in the art.

High molecular weight, typically greater than 100,000 Daltons, cis-1,4-polybutadiene polymers are known to have excellent response to ionizing radiation. Such polymers are commonly used in the manufacture of tires and have been shown to have a greater propensity to cross-link when exposed to ionizing radiation than polyethylene polymers that are widely used in the radiation processing industry. It is known that the cross-linking with these polymers proceeds via free radical mechanisms.

High molecular weight cis-1,4-polybutadiene polymers are of little or no interest in the coatings industry since solution viscosity is proportional to molecular weight and their use would most often call for dilution with volatile organic compounds (VOCs), solvents. However, the lower molecular weight 1,2-polybutadienes and modifications thereof are of interest. Having molecular weights of about 50,000 Daltons or less, these polymers are themselves sufficiently low in molecular weight to be pourable liquids and thus of interest in coatings that do not contain VOCs.

The use of lower molecular weight polybutadienes that have been end-capped with a functional groups such as an epoxy or an hydroxyl group have been disclosed for use in coating compositions containing cycloaliphatic epoxy compounds. These coating systems are described by Koleske in his review "Cationic Radiation Curing" (Federation of Societies for Coatings Technology; Blue Bell, Pa., 1991). The coating compositions disclosed by Koleske contain suitable photoinitiators and are cured by exposure to ultraviolet light. Such curing proceeds by a cationic mechanism involving the specific end-capped functionality of the polybutadienes. In contrast, the compositions of the present invention proceed via free radical mechanisms and involve the pendent vinyl functionality of the polybutadiene molecules.

The polybutadiene oligomers of the present invention can be homopolymers of polybutadiene having varying cis/trans ratios. They can also be copolymers or graft copolymers containing methyl acrylate, methyl methacrylate, acrylic acid, maleic anhydride, styrene and the like. Also, the polybutadiene oligomer can be end-capped with functional groups such as epoxy, hydroxyl, acrylate, methacrylate and the like.

An example of a modified 1,2-polybutadiene is Ricacryl™ 3801 (Total/Sartomer, formerly Ricon Resins) that has a number average molecular weight (Mn) of 3,200 and a bulk viscosity of 25,000 centipoises at 45° C. An example of an end-capped 1,2-polybutadiene is Poly bd™ 605 (Total/Sartomer, formerly Elf-Atochem) that has a number average molecular weight (Mn) of 2,400 and a bulk viscosity of 8,000 centipoises at 25° C.

Further examples of 1,2-polybutadiene oligomers that are in liquid form and are useful in the present invention are: Poly bd 600, Ricon 131, Ricon 142, Ricon 150, Ricon 152, Ricon 153, Ricon 154, Ricon 156, Ricon 156C, Ricon 157, Ricon 157C, Ricon 157G, Ricon 134/MA, Ricon 184/MA, Ricacryl 3100, Ricacryl 3500, Ricacryl FX9801, Ricacryl FX9803, CN-301, CN-302, CN-303 (Total/Sartomer).

The second ingredient of the curable homogeneous blend is a derivative of bis-phenol-A that is end-capped with acrylate groups. In one preferred embodiment, the bis-phenol-A derivative is an epoxy resin prepared from epichlorohydrin and an aromatic polyol. Once the bis-phenol-A epoxy resin is prepared, it can be end-capped with acrylate or methacrylate groups by known procedures. It is also within the scope of the present invention to employ a mixture of bis-phenol-A epoxy resins and aliphatic epoxy resins. In a most preferred embodiment, the bis-phenol-A epoxy resin is prepared from epichlorohydrin and bis-phenol-A (2,2-bis[4-hydroxyphenyl]propane).

An example of a bis-phenol-A epoxy diacrylate is Ebecryl™ 3200 (UCB Chemicals) that is sold as a proprietary mixture with an aliphatic/alkoxy monofunctional acrylate monomeric diluent. Further examples of bis-phenol-A diacrylate compounds are Ebecryl 3700 (UCB Chemicals) and Photomer™ 3016 (Cognis). Also of interest are ethoxylated bis-phenol-A diacrylates that have shown low volatility at elevated temperatures.

The third ingredient of the curable homogeneous blend is a reactive compound that enhances the compatibility between the 1,2-polybutadiene oligomer and the acrylated bis-phenol-A derivative. These are members selected from the group consisting of long-chain aliphatic monofunctional and multifunctional acrylates and methacrylates, long-chain polyoxyalkylene monofunctional and multifunctional acrylates and methacrylates, reactive monomers and compounds substituted with such alkyl and/or alkoxy segments, multifunctional reactive compounds and reactive compounds with heterogeneous chemical structures. Examples of long-chain aliphatic acrylates are: isodecyl acrylate, lauryl acrylate, lauryl methacrylate, nonyl phenyl acrylate, dodecyl acrylate and the like. Examples of polyoxyalkylene monoacrylates are: 2(2-ethoxyethoxy) ethyl acrylate, 2[2-(2-ethoxyhexyloxy)ethoxy]ethyl acrylate and the like. Examples of polyoxyalkylene diacrylates are: di(ethylene glycol) dimethacrylate, di(propylene glycol) diacrylate and the like. Examples of monomers substituted with long chain alkyl segments are: alkoxylated nonyl phenol acrylate and the like. Examples of multifunctional reactive compounds are trimethylolpropane triacrylate, trimethylolpropane trimethacrylate, di-trimethylolpropane tetraacrylate and the like. Examples of reactive compounds with heterogeneous structures are n-vinyl pyrrolidone, methyl-n-vinyl pyrrolidone and the like.

The present invention includes mixtures of different reactive constituents, both within and between the various groups disclosed above. For example, a mixture of isodecyl acrylate and lauryl acrylate can be employed. Also, a mixture of lauryl acrylate and 2(2-ethoxyethoxy) ethyl acrylate can be employed as the third ingredient of the curable blends. Further, the mixtures are not limited to two different such reactive components.

In contrast to non-reactive organic plasticizers, such as ditridecyl phthalate, the third ingredient is a compound that will react with the other two ingredients upon exposure to radiant energy. Non-reactive organic plasticizers as phthalate esters suffer in that they are prone to migrate and would thence mitigate against a desired long term coating durability. In contrast to drying oils that have long been used in coating formulations, such as linseed oil, the third ingredient is a compound that reacts through a terminal double bond. Drying oils are typically based on unsaturated fatty acids, such as the linolenic acid found in linseed oil, wherein the unsaturation is found within the organic chain and is not terminal to it. Such drying oils are also known for their inferior aging properties.

The three ingredients of the curable homogeneous blends are present in variable amounts, depending upon the desired physical properties of the final cured or crosslinked product. Preferably, the 1,2-polybutadiene oligomer is present in the blend in an amount of about 5% to about 50% based on the weight of the three constituents.

If the homogeneous blends are to be cured with ionizing radiation from an electron beam, then no catalyst or other free radical initiator is needed. Electron beam curing is the preferred method of curing these blends, especially when such are pigmented and used in high speed coating processes.

When the curing of these blends is to be initiated by ultraviolet light, a photoinitiator must be present. Examples of common photoinitiators are: (2,6-dimethoxybenzoyl)-2, 4,4-trimethylpentyl phosphine oxide, 2-hydroxy-2-methyl-1-phenyl-propane-1,1-hydroxy-cyclohexyl phenyl ketone, benzophenone and mixtures thereof.

When the curing of these blends is to be initiated in a radiofrequency field, an initiator that will decompose upon heating must be present. Examples of common initiators that decompose upon heating are: t-butyl perbenzoate, benzoyl peroxide, dicumyl peroxide and the like. The decomposition of such initiators can be facilitated by the use of amine or organo-metallic materials, as is well known in the art.

Other compounds can be optionally added to the homogeneous blends to achieve various results. For example, small amounts of multifunctional acrylated compounds, such as trimethylolpropane triacrylate, can be added to enhance the cure rate of the blends as well as to serve to enhance compatibility. To enhance the adhesion of the cured coating to both pretreated and untreated metals, monomers such as alkoxylated trifunctional acrylate esters (Sartomer SR 9008), acrylate esters having residual acidic functionality (Sartomer CD 9051) and/or an acrylic dimer (UCB Chemicals beta-CEA) can be added to the blends. A monomer such as hydroxyethyl methacrylate can be added to the blends, especially when the 1,2-polybutadiene oligomer is either end-capped with hydroxyl groups or modified with maleic anhydride, so as to increase adhesion to metal and prevent acid-induced metal corrosion.

As is common in the coatings industry, various pigments can be added for colorant purposes. Specific pigments, such as zinc chromate $[Zn_2CrO_4(OH)_2]$, can be added to enhance corrosion resistance as well as other additives used in resisting metal corrosion. Also dispersing agents, flow modification agents, slip agents, fire retardant agents, UV-protection agents, biocides, mildewicides, fungicides and the like can be optionally added to the homogeneous blends.

The various optional ingredients, including diluent reactive monomeric compounds, pigments, flow agents, adhesion promoters and the like can all be added using a low power mixer along with the components of the homogeneous blends to obtain a final liquid curable coating. If powdered pigments are employed, a high shear mixing system is preferred.

The thus prepared coatings can be applied by various means such as roll coating, dip coating, spray coating, electrostatic coating, film coating and the like. Substrates suitable for such coatings are metals, plastics, ceramics, glass and cellulosic materials. Preferably, metals are employed as the substrate.

When the coatings are cured using ionizing radiation from an electron beam, self-shielded accelerators having voltage potentials of about 150,000 to about 300,000 volts can be employed. Electron emitters having about 70,000 to about 125,000 volts potential can also be used. As is known in the art, the ability of the electron beam to penetrate thick, opaque coatings is related to the beam voltage. For pigmented metal coil coatings of 20 micron thickness, the 100,000 volt beam potential from an electron emitter is sufficient to completely cure a coating down to the metal substrate. In electron beam curing, it is preferable to use an inert atmosphere in the curing zone since the presence of oxygen tends to inhibit the free radical crosslinking mechanism.

When the coatings are cured by ultraviolet light, an electrodeless ultraviolet curing system (Fusion UV Curing Systems) can be employed as well as the more common electrode attached lamps. The wavelength output of the lamp and the photoinitiator system used are matched in order to attain the most efficient curing. When dealing with pigmented systems, ultraviolet curing proceeds at much slower rates than does electron beam curing.

A third method of curing involves the use of inductive radio-frequency fields to couple with specific metal substrates to generate heat. When such a process is used, the homogeneous blends are modified with known free radical initiators that decompose upon heating. For example, benzoyl peroxide can be added to the homogeneous blends to initiate thermal curing using radiant energy from an induction coil. Combinations of induction heating followed or preceded by exposure to an electron beam or ultraviolet light are also possible.

The coatings made from the disclosed compositions exhibit an excellent balance of surface hardness, flexibility and durability under adverse conditions. The coatings can be cured using radiant energy in the form of ionizing radiation from an electron beam, ultraviolet light radiation or inductive radio frequency heating of a metal substrate. Metals having such coatings are very resistant to chemicals and attack by moisture. Specified additives, such as some reactive monomers, can be added to these coatings to enhance reactivity, promote adhesion and to control viscosity. When ultraviolet light is used to initiate cure, the coating composition preferably contains at least one photo initiator. When inductive coupling with a metal substrate is used to initiate cure, the coating composition preferably contains at least one initiator that will thermally decompose at modest temperatures to generate free radicals, such as benzoyl peroxide. Combinations of the three curing methods, electron beam radiation, ultraviolet radiation and/or inductive radio frequency radiation, can be used. The compositions described eliminate volatile organic compounds (VOCs) in that they do not contain solvents in order to attain desirable coating viscosities. When called for, pigments can be added to the coating compositions. The coatings can be applied directly to discrete pieces, such as metal sheets, or continuously, as onto metal coil stock. The coatings can be used as primers and as top coats, clear and pigmented for metal substrates.

The invention will be more fully understood with reference to the following nonlimiting examples in which all parts, percentages, ratios and so forth, are by weight unless otherwise noted.

EXAMPLE I

Test panels of Galvalume™, a galvanized steel modified with a zinc/aluminum alloy, having a gauge thickness of 0.5 mm were obtained. Using a Cowles type dispersion blade mixer, coating compositions were prepared using a 1,2-polybutadiene oligomer that is end-capped with epoxide and hydroxyl groups, Poly bd 605 (Total/Sartomer), an acrylated bis-phenol-A epoxy derivative containing an aliphatic/alkoxy diluent, Ebecryl 3200 (UCB Chemicals), monomers to enhance adhesion and cure rate and a white pigment, titanium dioxide.

Test panels were first primed on one surface with a proprietary metal primer formulation (Strathmore Products G29-0005P) to a thickness of about 5 microns. After coating, this primer was air dried and cured.

Hand coatings of the polybutadiene/acrylated bis-phenol-A derivative coating compositions were made on the primed Galvalume using a No. 15 meyer rod to give a coating thickness of about 20 microns. The coated test panels were exposed to ionizing radiation in an inert nitrogen atmosphere using an electron emitter from Advanced Electron Beams with the voltage set at 100 keV. The opaque coatings were all cured at a modest dose of 15 kiloGray (kGy).

Table I below presents the results of this experiment wherein four different combinations of polybutadiene/acrylated bis-phenol-A derivative coating compositions were used.

TABLE I

| Ingredient | a | b | c | d |
|---|---|---|---|---|
| Poly bd 605 | 7.5% | 15.0% | 22.5% | 30.0% |
| Ebecryl 3200 | 54.5% | 47.0% | 39.5% | 32.0% |
| HEMA[a] | 4.0% | 4.0% | 4.0% | 4.0% |
| TMPTA[b] | 4.0% | 4.0% | 4.0% | 4.0% |
| Titanium dioxide | 30.0% | 30.0% | 30.0% | 30.0% |

[a]HEMA is hydroxyethyl methacrylate, used to enhance adhesion.
[b]TMPTA is trimethylolpropane triacrylate.

All four compositions passed ASTM D-3359, "Test Methods for Measuring Adhesion by Tape Test," and ASTM D-4145, "Test Method for Coating Flexibility of Prepainted Steel". The crosshatch tape adhesion test and a 0-T bend test respectively. Increasing the Poly bd 605 content was found to enhance the reverse impact resistance of the coating when test per ASTM D-2797, "Test Method for Resistance of Organic Coatings to the Effects of Rapid Deformation (Impact)." Formulations "a" and "b" exhibited 0.23 kg-m impact resistance; formulation "c" 0.46 kg-m, where 1 kg-m=86.8 inch-pounds.

EXAMPLE II

Test panels of cold rolled steel that had been previously treated with an iron phosphate coating, having a gauge thickness of 0.7 mm, were obtained. Using a Cowles type dispersion blade mixer, coating compositions were prepared using a 1,2-polybutadiene oligomer that had been graft modified with polar compounds as methacrylates, Ricacryl 3801 (Total/Sartomer), an acrylated bis-phenol-A epoxy derivative containing a reactive aliphatic/alkoxy diluent, Ebecryl 3200 (UCB Chemicals), monomers to reduce viscosity, isodecyl acrylate, and to enhance cure rate, adhesion promoters and a white pigment, titanium dioxide.

Hand coatings of the polybutadiene oligomer/acrylated bis-phenol-A epoxy derivative coating compositions were made on the iron phosphate cold rolled steel using a No. 15 meyer rod to give a coating thickness of about 20 microns. The coated test panels were exposed to ionizing radiation in an inert nitrogen atmosphere using an electron emitter from Advanced Electron Beams with the voltage set at 100 keV. These opaque coatings were all cured at a modest dose of 14 kiloGray (kGy).

Table II shows the results of this experiment wherein four different combinations of a polybutadiene oligomer/acrylated bis-phenol-A epoxy derivative coating compositions were used.

TABLE II

| Ingredient | a | b | c | d |
|---|---|---|---|---|
| Ricacryl 3801 | 7.5% | 15.0% | 22.5% | 30.0% |
| Ebecryl 3200 | 40.5% | 33.0% | 22.5% | 18.0% |
| Isodecyl acrylate | 15.0% | 15.0% | 15.0% | 15.0% |
| CD 9051[c] | 4.0% | 4.0% | 4.0% | 4.0% |
| TMPTA | 3.5% | 3.5% | 3.5% | 3.5% |
| Titanium dioxide | 30.0% | 30.0% | 30.0% | 0.0% |

[c]CD 9051 is a trifunctional acid ester used to promote adhesion (Total/Sartomer).

All four compositions (a, b, c, and d) passed ASTM D-3359, "Test Methods for Measuring Adhesion by Tape Test." Resistance to reverse impact, per ASTM D-2797, was found to improve with increasing polybutadiene oligomer content. Formulation "a" exhibited 0.12 kg-m impact resistance; formulations "b" and "c" 0.23 kg-m, where 1 kg-m=86.8 inch-pounds. Conversely, surface hardness was found to decrease with excess polybutadiene content. Formulations "a", "b" and "c" exhibited a Hoffman hardness of 500 grams; formulation "d" of 400 grams.

EXAMPLE III

Test panels of aluminum were obtained. Using a Cowles type dispersion blade mixer, coating compositions were prepared using a 1,2-polybutadiene oligomer that is end-capped with epoxide and hydroxyl groups, Poly bd 605 (Total/Sartomer), an acrylated bis-phenol-A epoxy derivative containing an aliphatic/alkoxy diluent, Ebecryl 3200 (UCB Chemicals), monomers to enhance adhesion and cure rate and a white pigment, titanium dioxide. To this was added selected photo initiators.

Hand coatings of the polybutadiene/acrylated bis-phenol-A epoxy derivative coating compositions were made on aluminum using a No. 5 meyer rod to give a coating thickness of about 5 microns. The coated test panels were exposed to ultraviolet radiation from an electrodeless ultraviolet lamp having an output of 120 watts per centimeter of bulb length and an emission spectra having a peak intensity in the 350 to 380 nanometer range (a "D" bulb). The panels were transported under the lamp on a conveyor running at 2.4 meters per minute.

Table III below presents the results of this experiment wherein three different photo initiators were used in the same polybutadiene/acrylated bis-phenol-A epoxy coating composition.

TABLE III

| Ingredient | a | b | c |
|---|---|---|---|
| Poly bd 605 | 14.5% | 14.5% | 14.5% |
| Ebecryl 3200 | 45.4% | 45.4% | 45.4% |
| HEMA | 3.9% | 3.9% | 3.9% |
| TMPTA | 3.9% | 3.9% | 3.9% |
| Titanium dioxide | 29.0% | 29.0% | 29.0% |
| Ciba Irgacure 500 | 3.4% | — | — |
| Ciba Darocur 1173 | — | 3.4% | — |
| Ciba Irgacure 1700 | — | — | 3.4% |

All three compositions were found to cure under ultraviolet light and have good surface properties.

EXAMPLE IV

Test panels of Galvalume, a galvanized steel modified with a zinc/aluminum alloy, having a gauge thickness of 0.5 mm were obtained. Using a Cowles type dispersion blade mixer, coating compositions were prepared using a 1,2-polybutadiene oligomer that is end-capped with epoxide and hydroxyl groups, Poly bd 605 (Total/Sartomer), an acrylated bis-phenol-A epoxy derivative containing an aliphatic/alkoxy diluent, Ebecryl 3200 (UCB Chemicals), monomers to enhance adhesion and cure rate and a pigment known to enhance corrosion resistance, zinc chromate [$Zn_2CrO_4(OH)_2$].

Hand coatings of the polybutadiene/bis-phenol-A epoxy derivative coating compositions were made on the Galvalume with a No. 5 meyer rod to give a coating thickness of about 5 microns. The coated test panels were exposed to ionizing radiation in an inert nitrogen atmosphere using an electron emitter from Advanced Electron Beams with the voltage set at 100 keV and cured at doses between 15 and 45 kGy. These coatings are intended to serve as the primer coats for subsequent coatings to be applied to the metal. Coating formulations as illustrated in Examples I and II and applied at greater film thicknesses can be used as top coats on these primed systems and also cured using ionizing radiation from an electron beam.

Table IV shows the results of this experiment wherein the hydroxyl adhesion promoter, hydroxyethyl methacrylate, was used in combination with the polybutadiene/acrylated bis-phenol-A epoxy derivative coating compositions that were modified with zinc chromate [$Zn_2CrO_4(OH)_2$] to enhance corrosion resistance.

TABLE IV

| Ingredient | a |
|---|---|
| Poly bd 605 | 24.4% |
| Ebecryl 3200 | 51.0% |
| HEMA | 4.8% |
| TMPTA | 4.8% |
| Zinc chromate | 15.0% |

Durable coatings were attained at 45 kGy under nitrogen that could serve as primers, be applied to metals and wound into coil stock without coating transfer. Adhesion to the Galvalume was attained as well as intercoat adhesion between the primer system and the white pigmented top coats, as illustrated in Example I.

EXAMPLE V

Test panels of Galvalume, a galvanized steel modified with a zinc/aluminum alloy, having a gauge thickness of 0.5 mm were obtained. Using a Cowles type dispersion blade mixer, coating compositions were prepared using a 1,2-polybutadiene oligomer that is end-capped with epoxide and hydroxyl groups, Poly bd 605 (Total/Sartomer), an acrylated bis-phenol-A epoxy compound, Ebecryl 3700 (UCB Chemicals), a second acrylated bis-phenol-A derivative, an ethoxylated bis-phenol-A diacrylate, SR-349 (Total/Sartomer), a multifunctional monomer that enhances compatibility and cure rate, TMPTA, a pigment known to enhance corrosion resistance, zinc chromate [$Zn_2CrO_4(OH)_2$], and a free radical initiator that will decompose on heating, such as benzyol peroxide.

Hand coatings of the polybutadiene/acrylated bis-phenol-A derivatives were made on the Galvalume with a No. 5 meyer rod to give a coating thickness of about 5 microns. The coated test panels were exposed to heat in a convection oven for 5 to 10 minutes at 150° C. to 120° C. with shorter time being used at the higher temperature. These coatings are intended to serve as the primer coats for subsequent coatings to be applied to the metal. Coating formulations as illustrated in Examples I and II and applied at greater film thicknesses can be used as top coats on these primed systems and then cured using ionizing radiation from an electron beam.

Table V shows the results of this experiment wherein an alkoxylated bis-phenol-A diacrylate, that has little volatility at elevated temperatures, is used in combination with the polybutadiene/acrylated bis-phenol-A derivatives in a coating composition.

TABLE V

| Ingredient | a |
|---|---|
| Poly bd 605 | 15.0% |
| Ebecryl 3700[d] | 16.0% |
| SR 349[e] | 46.0% |
| TMPTA | 5.0% |
| Zinc chromate | 15.0% |
| Luperox ATC[f] | 3.0% |

[d]Ebecryl 3700 is a non-diluted bis-phenol-A epoxy diacrylate (UCB Chemicals).
[e]SR 349 is an acrylated ethoxylated bis-phenol-A derivative (Total/Sartomer).
[f]Luperox ATC is a 50% paste of benzoyl peroxide.

The thermally cured coating composition exhibited adhesion to the Galvalume, full cure under the specified conditions and no volatile emissions. Induction heating tests were also conducted at the Lepel Corporation that showed Galvalume readily couples in an induction field. Temperatures of 163° C. to 177° C. could be reached in seconds using a frequency of 133 kHz. Such heating was also sufficient to fully cure this composition and there was no evidence of any volatile organic emissions. Such rapid induction heating of the metal substrate was found to be sufficient to decompose a peroxide type of free radical initiator. Thus high speed production use of such primer and coating materials is possible.

To those skilled in the art, embellishments of the above described curable coating technology would be apparent.

What is claimed is:

1. A process for preparing a coated substrate comprising:
   (a) obtaining a substrate with a clean surface,
   (b) applying a coating to the substrate wherein the coating comprises a homogeneous blend comprising:
      (x) a 1,2-polybutadiene oligomer having a number average molecular weight (Mn) of about 500 Daltons to about 50,000 Daltons,
      (y) a bis-phenol-A derivative that is end-capped with acrylate functionality, and
      (z) a reactive component that has at least one terminal double bond and that enhances the compatibility between the 1,2-polybutadiene oligomer and the bis-phenol-A derivative, and
   (c) curing the homogeneous blend by exposing said blend to a sufficient level of a predetermined form of radiant energy.

2. A process for preparing a coated substrate according to claim 1 wherein the radiant energy is derived from a source which is a member selected from the group consisting of electron beam, ultraviolet, radiofrequency, infrared, and combinations thereof.

3. A process for preparing a coated substrate according to claim 2, wherein the substrate is an electrically conductive material that is heated in a radiofrequency induction field to initiate catalyst activity.

4. A process for preparing a coated substrate comprising:
(a) obtaining a substrate with a clean surface,
(b) applying a coating to the substrate wherein the coating comprises a homogeneous blend comprising:
  (w) a 1,2-polybutadiene oligomer having a number average molecular weight (Mn) of about 500 Daltons to about 50,000 Daltons,
  (x) a bis-phenol a derivative that is end-capped with acrylate functionality, and
  (y) a reactive component that has at least one terminal double bond and that enhances the compatibility between the 1,2-polybutadiene oligomer and the bis-phenol-A derivative, and
  (z) a ground state catalyst that initiates free radical cross-linking upon exposure to heat, and
(c) curing the homogeneous blend by exposing said blend to a sufficient level of a predetermined form of radiant energy.

5. A process for preparing a coated substrate according to claim 4 wherein the homogeneous blend is exposed to both thermal energy and radiant energy.

6. A curable homogeneous blend comprising:
(a) a 1,2-polybutadiene copolymer having a number average molecular weight (Mn) of about 500 Daltons to about 50,000 Daltons,
(b) a bis-phenol-A derivative that is end-capped with acrylate functionality, and
(c) a reactive component that has at least one terminal double bond and that enhances the compatibility between the 1,2-polybutadiene oligomer and the acrylated bis-phenol-A derivative.

7. A curable blend according to claim 6 wherein the 1,2-polybutadiene copolymer is prepared from butadiene and a vinyl monomer that is a member selected from the group consisting of: styrene, vinyl acetate, divinyl benzene, isoprene, chloroprene, alkyl acrylates, alkyl methacrylates, ethylene, propylene, butylene and mixtures thereof.

8. A curable homogeneous blend comprising:
(a) a 1,2-polybutadiene oligomer having a number average molecular weight (Mn) of about 500 Daltons to about 50,000 daltons,
(b) an epoxy prepared from epichlorohydrin and bis-phenol-A that is end-capped with acrylate functionality, and
(c) a reactive component that has at least one terminal double bond and that enhances the compatibility between the 1,2-polybutadiene oligomer and the acrylated bis-phenol-A derivative.

9. A curable homogeneous blend comprising:
(a) a 1,2-polybutadiene oligomer having a number average molecular weight (Mn) of about 500 Daltons to about 50,000 Daltons,
(b) a bis-phenol-A derivative that is end-capped with acrylate functionality, and
(c) a reactive component substituted with long chain alkyl or alkoxy segments that has at least one terminal double bond and that enhances the compatibility between the 1,2-polybutadiene oligomer and the acrylated bis-phenol-A derivative.

10. A curable blend according to claim 9 wherein the substituted reactive component is a member selected from the group consisting of: alkoxylated nonyl phenol acrylate and alkoxylated nonyl phenol methacrylate.

11. A curable homogeneous blend comprising:
(a) a 1,2-polybutadiene oligomer having a number average molecular weight (Mn) of about 500 Daltons to about 50,000 Daltons,
(b) a bis-phenol-A derivative that is end-capped with acrylate functionality, and
(c) a heterocyclic reactive organic compound that has at least one terminal double bond and that enhances the compatibility between the 1,2-polybutadiene oligomer and the acrylated bis-phenol-A derivative.

12. A curable blend according to claim 11 wherein the heterocyclic compound is a member selected from the group consisting of: n-vinyl pyrrolidone and methyl-n-vinyl pyrrolidone.

13. A curable homogeneous blend comprising:
(a) a 1,2-polybutadiene oligomer having a number average molecular weight (Mn) of about 500 Daltons to about 50,000 Daltons,
(b) a bis-phenol-A derivative that is end-capped with acrylate functionality,
(c) a reactive component that has at least one terminal double bond and that enhances the compatibility between the 1,2-polybutadiene oligomer and the acrylated bis-phenol-A derivative, and
(d) a hydroxy functional adhesion promoter.

14. A curable blend according to claim 13 wherein the hydroxy functional compound is a member selected from the group consisting of hydroxyethyl methacrylate and ethoxylated hydroxyethyl methacrylate.

15. A coated substrate wherein the coating comprises a crosslinked composition prepared from a homogeneous blend comprising:
(a) a 1,2-polybutadiene copolymer having a number average molecular weight (Mn) of about 500 Daltons to about 50,000 Daltons,
(b) a bis-phenol-A derivative that is end-capped with acrylate functionality, and
(c) a reactive component that has at least one terminal double bond and that enhances the compatibility between the 1,2-polybutadiene oligomer and the bis-phenol-A derivative.

16. A coated substrate according to claim 15 wherein the 1,2-polybutadiene copolymer is prepared from butadiene and a vinyl monomer that is a member selected from the group consisting of: styrene, vinyl acetate, divinyl benzene, isoprene, chloroprene, alkyl acrylates, alkyl methacrylates, ethylene, propylene, butylene and mixtures thereof.

17. A coated substrate wherein the coating comprises a crosslinked composition prepared from a homogeneous blend comprising:
(a) a 1,2-polybutadiene oligomer having a number average molecular weight (Mn) of about 500 Daltons to about 50,000 Daltons,
(b) a bis-phenol-A derivative prepared from epichlorohydrin and bis-phenol-A that is end-capped with acrylate functionality, and
(c) a reactive component that has at least one terminal double bond and that enhances the compatibility between the 1,2-polybutadiene oligomer and the bis-phenol-A derivative.

* * * * *